June 17, 1952 G. A. LYON 2,600,410
WHEEL COVER
Filed Aug. 13, 1949 2 SHEETS—SHEET 1

Inventor
GEORGE ALBERT LYON
by The firm of Charles A. Hill Attys.

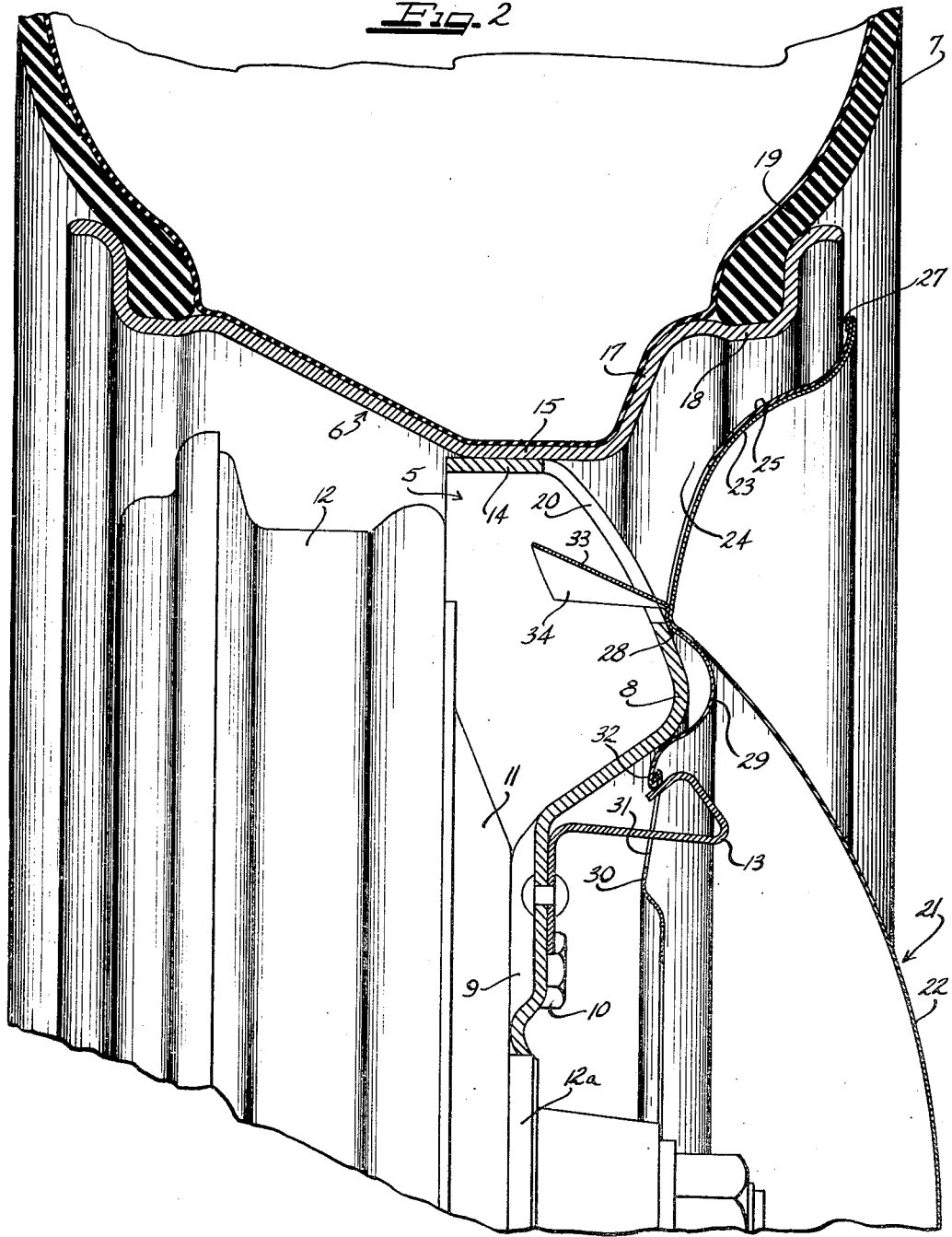

Patented June 17, 1952

2,600,410

UNITED STATES PATENT OFFICE 2,600,410

WHEEL COVER

George Albert Lyon, Detroit, Mich.

Application August 13, 1949, Serial No. 110,096

18 Claims. (Cl. 301—37)

The present invention relates to improvements in wheel structures and more particularly concerns improvements in wheels for automotive vehicles where heating of the brake drums presents a serious problem.

An important object of the present invention is to provide in a wheel structure improved means for cooling the associated brake drum.

Another object of the invention is to provide an improved wheel structure wherein a novel cover assembly is utilized and by which brake drum cooling is promoted.

A further object of the invention is to provide an improved wheel cover which will assist in cooling the brake drum associated with a wheel on which the cover may be mounted.

According to the general features of the present invention there is provided in a wheel structure including a wheel having a tire rim and a wheel body arranged to be attached to the brake drum portion of a vehicle chassis, the wheel body having air circulation openings therethrough, and air circulation promoting means separably attachable to the outer side of the wheel and including means defining an air circulation passage in association with the tire rim and other means projecting through the air circulation openings in the wheel body and enhancing the movement of air through said wheel openings into said circulation passage in the rotation of the wheel.

According to other general features of the invention there is provided a wheel structure including a tire rim and a load sustaining wheel body having brake drum air circulation openings therein, a cover for the outer side of the wheel including a portion substantially concealing the tire rim in spaced relation and providing with the tire rim an air circulation passage from said wheel openings to the outer extremity of the tire rim, and a portion of the cover including air deflecting projections extending into said openings and adapted to promote the circulation of air from behind the wheel through said openings and through said passage in the rotation of the wheel.

According to yet other general features of the invention there is provided a wheel cover for disposition at the outer side of a vehicle wheel including a tire rim and a load sustaining body portion having brake drum air circulation openings, means for attaching the cover to the wheel, a portion of the cover being dimensioned to lie in substantially concealing relation to the tire rim of a wheel and in spaced relation to the tire rim to provide a circulation passage from the wheel openings to the outer side of the tire rim, and extensions projecting from the cover generally axially inwardly and comprising air deflectors to extend through said wheel openings toward the rear of the wheel for deflecting air through the wheel openings in the rotation of the wheel.

Other objects, features and advantages of the present invention will be readily apparent from the following detailed description of a preferred embodiment thereof taken in conjunction with the accompanying drawings in which:

Figure 2 is an enlarged radial sectional detail view taken substantially on the line II—II of Fig. 1.

As shown on the drawings:

Figure 1:
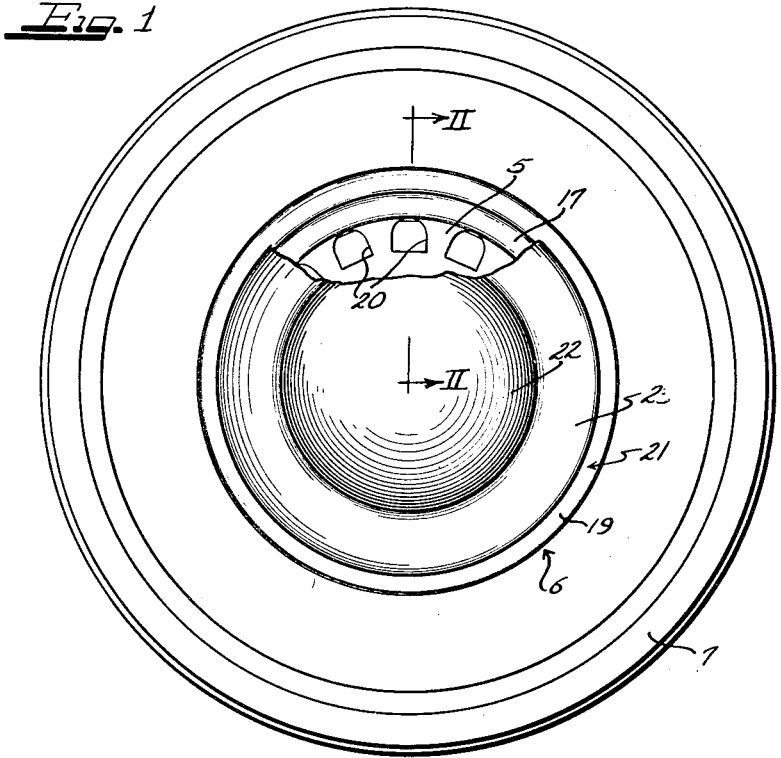
Figure 1 is a side elevational view of a vehicle wheel embodying the features of the present invention and showing the wheel cover associated therewith partially broken away for purposes of illustration.

A vehicle wheel with which the present invention is concerned comprises a load sustaining wheel body 5 and a tire rim 6 adapted to support a pneumatic tire and tube assembly 7. Both the wheel body and the tire rim are adapted to be made from appropriate gauge sheet metal, the wheel body being stamped to form and the tire rim being preferably rolled into the desired cross section.

The wheel body 5 comprises a metallic disk intermediately annularly formed with a projecting reinforcing nose bulge 8 encircling a central bolt-on flange 9 arranged to be secured as by means of attachment screws or bolts 10 in customary manner to an outwardly facing wall portion 11 of a brake drum structure 12 carried by an axle assembly 12a of the chassis of an automotive vehicle. Goose-neck type cover-retaining spring clips 13 may be carried by the bolt-on flange 9. At its outer periphery, the wheel body is formed with an attachment flange 14 which is suitably secured as by welding or riveting to a base flange 15 of the tire rim.

The tire rim 6 is any preferred multi-flanged drop center type including an outer side flange 17, intermediate flange 18 and terminal flange 19.

Overheating of the brake drums presents a substantial problem to which the automotive industry is giving substantial attention at the present time. Inasmuch as during high speed operation the relatively wide tire and tube assemblies now in use substantially shield the brake drums of the associated wheels from the rearwardly moving air during operation overheating of the brake drum can easily occur.

According to the present invention improved means are provided for promoting circulation of cooling air past and about the brake drum 12. To this end the wheel body 5 is provided with an appropriate series of air circulation apertures 20 therethrough at the radially outer side of the nose bulge 8 and preferably adjacent to the attachment flange 14. In this way air may circulate through the wheel body and since the air circulation apertures 20 are at the outer margin of the wheel body such apertures are generally in line with the periphery of the brake drum 12 where cooling air circulation is desired.

However, the apertures 20 and the relatively angular multi-flange formation of the outer side of the tire rim 6 presents a fairly unattractive appearance and it is therefore advantageous to cover the same ornamentally. Furthermore, it is desirable to protect the air circulation apertures 20 as well as other parts of the wheel from road splash toward the outer side of the wheel. To this end, an ornamental and protective cover 21 is provided for substantially covering the outer side of the wheel. In the present instance the cover 21 is of the full cover disk type including a central crown portion 22 generally simulating a hub cap and extending to the radially outer side of the nose bulge 10 adjacent to the inner side of the air circulation openings 20 and integral in one piece with a radially outer trim ring portion 23. In order to promote air circulation, the trim ring portion 23 is formed to lie in substantially concealing but space relation to the outer side of the tire rim and more particularly the side flange 17, intermediate flange 18 and the terminal flange 19 whereby to provide an air circulation passage 24 extending generally radially and axially outwardly from the air circulation apertures 20. Thus the space between the outer extremity of the trim ring portion 23 of the cover and the terminal flange 19 of the tire rim provides an air circulation outlet opening annularly entirely about the cover 21.

In the present instance the cover 21 is provided with snap-on pry-off retaining means engageable with the retaining clips 13. For this purpose a retaining ring member is assembled with the inner side of the trim ring cover portion 23, having its outer margin secured in assembly with the trim ring portion by means such as an underturned retaining and reinforcing peripheral flange 27. From the outer peripheral connecting flange, the retaining ring member 25 extends generally radially inwardly in snug engagement with the inner face of the trim ring portion 23 and has a centering and seating inwardly extending reinforcing annular rib 28 which is adapted to seat against the nose bulge 8 at the inner sides of the air circulation apertures 20 and may also interestingly receive a complementary groove rib at the juncture of the cover portions 22 and 23. Radially inwardly from the rib 28 the retaining ring is formed with an annular axially outwardly extending relatively wide rib formation 29 providing an inwardly opening groove for clearing the peak of the nose bulge 8. Extending generally radially inwardly from the radially inner side of the rib 29 is a cover attachment flange 30 which is arranged to generally overlie the bolt-on flange 9 and which has an appropriate series of clip clearing apertures 31 through which the heads of the retaining clips 13 extend. Coinciding with the radially outer sides of the clip clearing apertures 31, the flange 30 is formed with a clip bearing return bent reinforcing fold 32 which is substantially rigid and is adapted to bear in snap-on pry-off retaining relation against the cam faces of the retaining clips 13.

Figure 3:
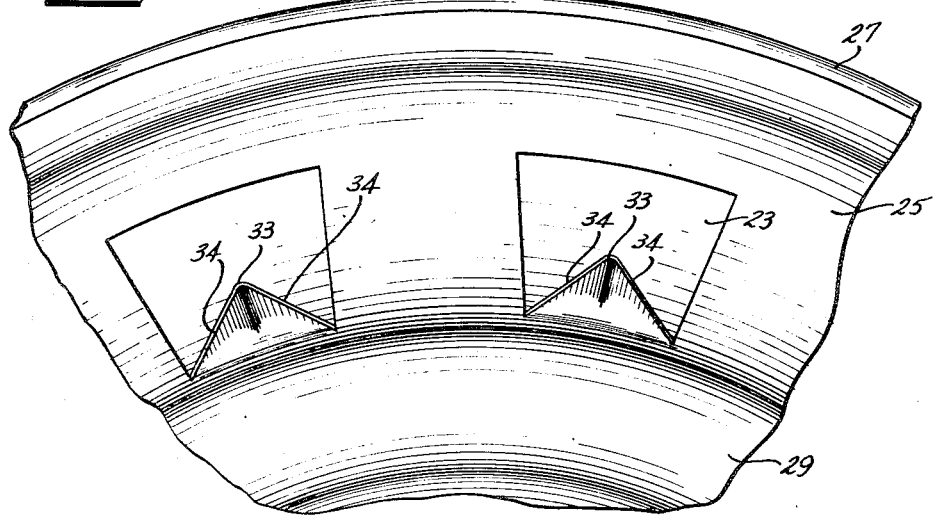
Figure 3 is an enlarged fragmentary rear elevational view of the novel cover of the present invention.

In order to promote brake drum cooling air circulation through the wheel body apertures 20 and the air circulation passage 24, the cover 21 is provided with means cooperating with the air circulation apertures 20 to deflect air from the inner side to the outer side of the wheel through the apertures 20 during operation, that is rotation, of the associated wheel, and especially in the high speed rotation of the wheel. In an advantageous form, the air circulation promoting means comprises a series of air deflectors 33 projecting generally axially inwardly from the cover through the air circulation apertures 20. Expediently the deflectors 33 are formed as integrally struck out deflector extensions or fingers derived by striking out appropriate portions of the body of the retaining ring member 25 at appropriate areas radially outwardly from the reinforcing and wheel-engaging rib 28 and in number and position corresponding to the wheel body circulation apertures 20, substantially as shown in Figures 2 and 3.

To effect air circulation, the deflectors 33 are formed as vanes. However in order to permit use of the cover interchangeably on either the left or right side of a vehicle and attain equal efficiency for air circulation purposes, each of the deflector vanes 33 is formed as a two way vane structure including a pair of equal oppositely tapering vane wings 34 effectuated by bending each of the deflector extensions along a longitudinal line toward opposite sides as best seen in Fig. 3. The construction and relationship of the deflector extensions 33 is such with respect to the air circulation apertures 20 that they will extend freely through the apertures 20 to a substantial extent behind the wheel body into the space between the wheel body and the brake drum. As a result, during rotation of the wheel air is deflected by the deflector vanes 33 from the rear to the outer side of the wheel and about and past the brake drum 12 and then onwardly through and out of the air passage 24.

Reference is made to my copending application, Serial No. 54,699, filed October 15, 1948, for features shown but not claimed herein.

I claim as my invention:

1. In a wheel structure including a wheel having a tire rim and a wheel body arranged to be attached to the brake drum portion of a vehicle chassis, the wheel body having air circulation openings therethrough, and air circulation promoting means separably attachable to the outer side of the wheel and including means defining an air criculation passage in association with the tire rim and other means projecting from said air circulation promoting means through the air circulation openings in the wheel body and enhancing the movement of air through said wheel openings into said circulation passage in the rotation of the wheel.

2. A wheel structure including a tire rim and a load sustaining wheel body having brake drum air circulation openings therein, a cover for the outer side of the wheel including a portion substantially concealing the tire rim in spaced relation and providing with the tire rim an air circulation passage from said wheel openings to the outer extremity of the tire rim, and a portion of the cover including air deflecting projections extending into said openings and adapted to promote the circulation of air from behind the wheel through said openings and through said passage in the rotation of the wheel.

3. A wheel cover for disposition at the outer side of a vehicle wheel including a tire rim and a load sustaining body portion having brake drum air circulation openings, means for attaching the cover to the wheel, a portion of the cover being dimensioned to lie in substantially concealing relation to the tire rim of a wheel and in spaced relation to the tire rim to provide a circulation passage from the wheel openings to the outer side of the tire rim, and extensions projecting from the cover generally axially inwardly and comprising air deflectors to extend through said wheel openings toward the rear of the wheel for deflecting air through the wheel openings in the rotation of the wheel.

4. In combination in a wheel structure including a wheel and a brake drum at the inner side of the wheel, the wheel including a body having air circulation openings therein, and means attached to the wheel body and including air vane means located at said openings and projecting from one side of the wheel body through said openings to the other side of the wheel body for promoting air circulation through said openings in the rotation of the wheel.

5. In combination in a wheel structure, a wheel having a body portion including brake drum air circulation openings and having cover retaining clips thereon, and a cover for the outer side of the wheel including means for snap-on pry-off engagement with said retaining clips and air circulation promoting vanes projecting through the air circulation openings.

6. In combination in a wheel structure, a wheel having a body portion including brake drum air circulation openings and having cover retaining clips thereon, and a cover for the outer side of the wheel including means for snap-on pry-off engagement with said retaining clips and air circulation promoting vanes projecting through the air circulation openings, said vanes including vane portions oppositely angled for optional use of the wheel structure and cover assembled therewith on either side of a vehicle.

7. In a wheel structure including a tire rim and a load sustaining disk type body portion, said body portion having a series of brake drum cooling air circulation openings therein, a cover for the outer side of the wheel including a central crown portion and an outer trim ring portion having a generally axially inwardly extending annular juncture, and air circulation promoting extensions projecting from adjacent said juncture generally axially inwardly through said apertures.

8. In a wheel structure including a wheel body having brake drum cooling air circulation apertures therein adjacent to the outer margin thereof, a wheel cover including a central crown portion and a radially outer trim ring portion, means extending generally axially inwardly from the trim ring portion to project through said air circulation apertures for promoting air circulation therethrough, and means behind said crown portion for attachment of the cover to the wheel.

9. A cover for disposition at the outer side of a vehicle wheel having a wheel body formed with brake drum air circulation apertures, a crown portion, a trim ring portion, said trim ring portion having means extending generally axially inwardly for projection through the brake drum air circulation apertures to promote air circulation therethrough, and means behind the crown portion for attachment of the cover to the wheel.

10. In a cover for disposition at the outer side of a vehicle wheel, an outer cover portion comprising integral crown and trim ring portions, and a retaining ring secured to the inner side of the trim ring portion and having a portion projecting generally radially inwardly behind the crown portion for attachment to a wheel, said retaining ring having generally axially inwardly extending vane projections adapted to extend through brake drum cooling air circulation apertures in the wheel with which the cover is associated.

11. In a cover for disposition at the outer side of a vehicle wheel, an outer cover portion comprising integral crown and trim ring portions, and a retaining ring secured to the inner side of the trim ring portion and having a portion projecting generally radially inwardly behind the crown portion for attachment to a wheel, said retaining ring having generally axially inwardly extending vane projections adapted to extend through brake drum cooling air circulation apertures in the wheel with which the cover is associated, said extensions being integrally struck out from said retaining ring.

12. In a cover for disposition at the outer side of a vehicle wheel having brake drum air circulation apertures therein, generally axially inwardly extending air circulation promoting vane elements on the cover adapted to extend inwardly through the air circulation apertures, said vane extensions including oppositely tapering vane wings.

13. A cover for disposition at the outer side of a vehicle wheel in which the wheel body has brake drum air circulation openings, a cover member having a series of generally axially inwardly extending air circulation vane extensions, each of said extensions comprising a generally axially creased body having oppositely sloping vane wings.

14. In a wheel cover for disposition at the outer side of a vehicle wheel, an outer cover portion including central crown and trim ring sections having an annular inwardly extending juncture rib, and an attachment ring member including a portion nested at the inside of the trim ring section and having the outer margin interlocked with the outer margin of the trim ring section, said retaining ring having a rib portion complementary to and internested with said juncture rib and a second rib radially inwardly from the internested rib as well as a radially inwardly extending retaining flange adapted to be engaged with retaining clips on a wheel.

15. In a wheel cover for disposition at the outer side of a vehicle wheel having a wheel body formed with brake drum air circulation apertures, a circular cover member formed from sheet material and arranged to be placed at the outer side of the wheel, and a plurality of generally axially inwardly extending air circulation promoting vanes formed from sheet material on said cover member and disposed to be projected through said apertures and to project substantially beyond the inner side of the cover member, said vanes being angled relative to the cover periphery to effect movement of air through said apertures in the rotation of the cover with the wheel.

16. In a cover structure for a wheel, including a flanged tire trim and a supporting body member joined to the rim and provided with spaced transverse openings, a circular wheel cover extending from the rim radially inwardly over its junction with the body member and having a space between its outer peripheral margin and the rim and also having a radially inner portion bottomed on the body member, said space defining an air circulating passageway communicating with the wheel openings, and a plurality of vanes attached to the underside of said cover adjacent said wheel openings radially outward of said bottomed portion for assisting in circulation of air in said space and openings.

17. In a cover structure for a wheel including a flanged tire rim and a supporting body member joined to the rim and provided with spaced transverse openings, a circular wheel cover to extend from the rim in spaced relation thereto radially inwardly over junction of the rim with the body member to afford a space between the outer peripheral margin of the cover and the rim, said cover also having a radially inner portion for closely opposing the body member, said space defining an air circulating passageway communicating with the wheel openings, and a member formed from sheet material and having a plurality of vanes integrally struck out therefrom and leaving holes therein, said member being attached to the underside of said cover to lie opposite said wheel openings radially outward of said inner portion for operation of said vanes in assisting in circulation of air in said space and openings.

18. In a cover structure for a wheel including a flanged tire rim and a supporting body member joined to the rim and provided with spaced transverse openings, a circular wheel cover to extend from the rim in spaced relation thereto radially inwardly over junction of the rim with the body member to afford a space between the outer peripheral margin of the cover and the rim, said cover also having a radially inner portion for closely opposing the body member, said space defining an air circulating passageway communicating with the wheel openings, and a member formed from sheet material and having a plurality of vanes integrally struck out therefrom and leaving holes therein, said member being attached to the underside of said cover to lie opposite said wheel openings radially outward of said inner portion for operation of said vanes in assisting in circulation of air in said space and openings, said cover and said member being closely related in the assembly so that said cover closes said holes.

GEORGE ALBERT LYON.

REFERENCES CITED

The following references are of record in the file of this patent:

UNITED STATES PATENTS

| Number | Name | Date |
|---|---|---|
| 1,665,437 | Booth | Apr. 10, 1928 |
| 2,143,950 | Kliesrath | Jan. 17, 1939 |
| 2,190,669 | Lyon | Feb. 20, 1940 |
| 2,248,707 | Horn | July 8, 1941 |
| 2,299,796 | Chase | Oct. 27, 1942 |
| 2,386,236 | Lyon | Oct. 9, 1945 |
| 2,441,008 | Chase | May 4, 1948 |